(12) United States Patent
Xie et al.

(10) Patent No.: US 11,101,700 B1
(45) Date of Patent: Aug. 24, 2021

(54) IMPEDANCE MATCHING NETWORK OPTIMIZATION METHOD FOR WIRELESS POWER TRANSFER SYSTEM UNDER MAXIMUM EFFICIENCY TRACKING

(71) Applicant: Jiangnan University, Jiangsu (CN)

(72) Inventors: Linbo Xie, Jiangsu (CN); Li Peng, Jiangsu (CN); Hongwei Feng, Jiangsu (CN); Qigao Fan, Jiangsu (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 0 days.

(21) Appl. No.: 17/052,449

(22) PCT Filed: May 8, 2020

(86) PCT No.: PCT/CN2020/089138
§ 371 (c)(1),
(2) Date: Nov. 2, 2020

(87) PCT Pub. No.: WO2021/008203
PCT Pub. Date: Jan. 21, 2021

(30) Foreign Application Priority Data

Jul. 12, 2019 (CN) .......................... 201910628859.X (51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC ....................................................... H02J 50/12
USPC .......................................................... 307/104
See application file for complete search history.

(56) References Cited

U.S. PATENT DOCUMENTS

| | | | | |
|---|---|---|---|---|
| 2015/0015197 A1* | 1/2015 | Mi | ......................... | B60L 53/122 320/108 |
| 2015/0302983 A1* | 10/2015 | Park | ......................... | H02J 50/12 320/108 |
| 2017/0353053 A1* | 12/2017 | Muratov | .................. | H02J 50/12 |

FOREIGN PATENT DOCUMENTS

| | | |
|---|---|---|
| CN | 103683529 A | 3/2014 |
| CN | 105529837 A | 4/2016 |
| CN | 109698561 A | 4/2019 |

(Continued)

OTHER PUBLICATIONS

Li, Xiaofei, "Research on Maximum Power Tracking and Maximum Efficiency Tracking of IPT Systems," Thesis for Engineering Doctorate, College of Automation of Chongqing University, Chongqing, China, Apr. 15, 2018, 113 pages. (ISSN:1674-0222X).

(Continued)

*Primary Examiner* — Joseph Chang
(74) *Attorney, Agent, or Firm* — Muncy, Geissier, Olds & Lowe, P.C.

(57) ABSTRACT

An impedance matching network optimization method for a wireless power transfer system under maximum efficiency tracking belongs to the field of wireless power transfer. The present invention proposes a novel impedance matching network optimization method for a WPT system under maximum efficiency. The method analyzes the nonlinearity of a bridge rectifier circuit, the adaptability of load change and other factors related to the maximum efficiency tracking, and provides an important reference for the WPT system in terms of maximum transfer efficiency.

1 Claim, 4 Drawing Sheets

(56) References Cited

FOREIGN PATENT DOCUMENTS

CN 110350673 A 10/2019
KR 10-2018-0069360 A 6/2018

OTHER PUBLICATIONS

Liu, Yuanyuan et al., "Maximum Efficiency Tracking Control Method for WPT System Based on Dynamic Coupling Coefficient Identification and Impedance Matching Network," IEEE Journal of Emerging and Selected Topics in Power Electronics (Early Access), Aug. 22, 2019, pp. 1-11 (ISSN:2168-6785).
International Search Report and Written Opinion dated Jul. 30, 2020 issued in corresponding International Application No. PCT/CN2020/089138.

* cited by examiner

IMPEDANCE MATCHING NETWORK OPTIMIZATION METHOD FOR WIRELESS POWER TRANSFER SYSTEM UNDER MAXIMUM EFFICIENCY TRACKING

TECHNICAL FIELD

The present invention belongs to the field of wireless power transfer, and particularly relates to an impedance matching network design method for a wireless power transfer system under maximum efficiency tracking.

BACKGROUND

The present invention discusses key issues related to the transfer efficiency of a Wireless Power Transfer (WPT) system in practical application, and considers that changes in the transfer distance or load of the system will cause the nonlinearity of the circuit and thus reduce the transfer efficiency. In order to keep the system at the maximum efficiency point, the present invention proposes a novel impedance matching network optimization method for a WPT system under maximum efficiency tracking, and meanwhile, analyzes the nonlinearity of a bridge rectifier circuit, the adaptability of load change and other factors affecting the maximum efficiency tracking.

Some studies show that the nonlinearity of the bridge rectifier circuit has a significant impact on the transfer characteristic of the system, and the system parameters designed on the basis of the purely resistive equivalent rectifier load will also lead to inevitable errors. Therefore, the nonlinear characteristic of the rectifier load cannot be ignored, and most of the existing impedance matching methods regard the rectifier load as a resistive load, which will bring errors to the reactive compensation of the system. As a result, it is of great significance to study the impact of the nonlinear characteristic of the rectifier load on the parameter design process of the wireless charging system.

The present invention analyzes the nonlinear characteristic of the rectifier load of the system according to the optimal load condition of the maximum efficiency transfer of the WPT system, and optimizes a design method for a T-type impedance matching network according to the impedance characteristic.

SUMMARY

Aiming at the problem that the change of the transfer distance or load of the WPT system will cause the nonlinearity of the circuit and thus reduce the transfer efficiency, the present invention proposes a novel impedance matching network optimization method for a WPT system under maximum efficiency to ensure that the WPT system works at the maximum efficiency point. The method analyzes the nonlinearity of a bridge rectifier circuit, the adaptability of load change and other factors related to the maximum efficiency tracking, and provides an important reference for the WPT system in terms of maximum transfer efficiency.

The present invention has the following technical solution:

An impedance matching network optimization method for a wireless power transfer system under maximum efficiency tracking, comprises the following steps:

1. Structure of Wireless Power Transfer System

The wireless power transfer system comprises a transmitting end and a receiving end, wherein the transmitting end is connected to a power frequency mains supply and composed of a voltage stabilizing circuit module, a high-frequency inverter module and a transmitting coil; the receiving end supplies power to the load, and is composed of a receiving coil, a T-type impedance matching network and a full-bridge rectifier circuit;

The voltage stabilizing circuit module converts 220 V mains supply to 48 V direct current, and performs corresponding smoothing filtering to eliminate harmonic waves in electrical signals; and the voltage stabilizing circuit module is connected with the high-frequency inverter module after outputting. The high-frequency inverter module converts 48 V direct current to high-frequency alternating current, and the high-frequency inverter module is connected with the transmitting coil. The transmitting coil is composed of a resonant capacitor $C_1$ and a transmitting coil $L_1$ which are connected in series, and high-frequency electrical signals output by the high-frequency inverter module cause a series resonant circuit composed of the resonant capacitor $C_1$ and the transmitting coil $L_1$ to generate resonant voltage and resonant current.

A receiving coil $L_2$ and a resonant capacitor $C_2$ constitute a resonant compensation network of the receiving end, which has the same resonance frequency as the transmitting end. M is a mutual inductor between the transmitting coil and the receiving coil, and the tightness of the magnetic coupling between the two coils is expressed by a coupling coefficient $k=M/\sqrt{L_1 L_2}$. $R_1$ and $R_2$ are equivalent resistors of the transmitting circuit and the receiving circuit, and $R_i$ is an equivalent resistor on the load side. Energy is transferred from the transmitting end to the receiving end through electromagnetic resonance. The receiving coil module is connected with an impedance matching network module. The T-type impedance matching network is composed of capacitors $C_{b1}$, $C_{b2}$ and an inductor $L_b$ of which the switching of the corresponding matching values is realized by a microprocessor controlling relay array, and connected with the full-bridge rectifier circuit. The full-bridge rectifier circuit module is composed of rectifier diodes $D_1$, $D_2$, $D_3$ and $D_4$, and $C_3$ is a bridge rectifier filter capacitor of which the charging and discharging effects are used to smooth the output voltage $U_L$. The full-bridge rectifier circuit is directly connected with the load resistor $R_L$.

2. Impedance Matching Network Design Method for Wireless Power Transfer System Under Maximum Efficiency Tracking (1) The transmitting coil and the receiving coil in the transfer model of the WPT system have the same resonance frequency, and the parameters of the two coils are assumed to be determined, wherein $u_1$ is the equivalent voltage source after the power transfer system passes through the high-frequency inverter circuit, and $i_1$ and $i_2$ are respectively the high-frequency resonant currents of the transmitting end and the receiving end. $L_1$ is the inductor of the transmitting coil, $L_2$ is the inductor of the receiving coil, $C_1$ and $C_2$ are resonant compensation capacitors corresponding to the transmitting end and the receiving end, M is a mutual inductor between the transmitting coil and the receiving coil, and the tightness of the magnetic coupling between the two coils is expressed by a coupling coefficient $k=M/\sqrt{L_1 L_2}$. $R_1$ and $R_2$ are equivalent resistors of the transmitting circuit and the receiving circuit, and $R_i$ is an equivalent resistor on the load side.

(2) According to Kirchhoff's voltage law, the loop equation of the equivalent model is:

$$\begin{cases} \dot{U}_1 = Z_1 \dot{I}_1 - j\omega M \dot{I}_2 & (1) \\ 0 = Z_2 \dot{I}_2 - j\omega M \dot{I}_1 \end{cases}$$

wherein $\dot{U}_1$, $\dot{I}_1$ and $\dot{I}_2$ are respectively vector representations of voltages $u_1$, $i_1$ and $i_2$, and $Z_1$ and $Z_2$ are equivalent impedances of the transmitting end and the receiving end, which meet:

$$\begin{cases} Z_1 = R_1 + j\left(\omega L_1 - \dfrac{1}{\omega C_1}\right) \\ Z_2 = R_2 + R_i + j\left(\omega L_2 - \dfrac{1}{\omega C_2}\right) \end{cases} \quad (2)$$

(3) The transmitting coil and the receiving coil have the same structure, that is $L_1=L_2=L$, $R_1=R_2=R$ and $C_1=C_2=C$. Therefore, the resonance frequency $f=1/2\pi\sqrt{LC}$ of the circuit can be determined by selecting appropriate parameters for L and C.

(4) Based on formulas (1) and (2), the current values of both sides can be calculated as follows:

$$\begin{cases} \dot{I}_1 = \dfrac{Z_2 \dot{U}_1}{Z_1 Z_2 + \omega^2 M^2} \\ \dot{I}_2 = \dfrac{j\omega M \dot{U}_1}{Z_1 Z_2 + \omega^2 M^2} \end{cases} \quad (3)$$

wherein $\Omega$ is the resonance angular frequency that meets $\omega=2\pi f$, and when resonance occurs, that is $Z_1=R$, $Z_2=R+R_i$.

(5) The input power $P_{in}$ of the WPT system and the output power $P_{out}$ of the $R_i$ end can be calculated as follows:

$$\begin{cases} P_{in} = \dfrac{U_1^2 (R+R_i)}{R^2 + RR_i + \omega^2 M^2} \\ P_{out} = \dfrac{\omega^2 M^2 U_1^2 R_i}{(R^2 + RR_i + \omega^2 M^2)^2} \end{cases} \quad (4)$$

wherein $U_1$ is the effective value of the input power supply voltage $u_1$, and the transfer efficiency $\eta$ can be calculated from formula (4):

$$\eta = \frac{P_{out}}{P_{in}} = \frac{\omega^2 M^2 R_i}{(R+R_i)(R^2 + RR_i + \omega^2 M^2)} \quad (5)$$

(6) By deriving $R_i$ of formula (5), the optimal load condition for maximizing the transfer efficiency can be obtained as follows:

$$\begin{cases} \dfrac{d\eta}{dR_i} = 0 \\ \dfrac{d^2\eta}{dR_i^2} < 0 \end{cases} \rightarrow R_{i\_\eta max} = \sqrt{R^2 + \omega^2 M^2} \quad (6)$$

By substituting formula (6) into formula (5), the maximum output transfer efficiency $\eta_{max}$ can be calculated as follows:

$$\eta_{max} = \frac{\omega^2 M^2 R_{i\_\eta max}}{(R+R_{i\_\eta max})(R^2 + RR_{i\_\eta max} + \omega^2 M^2)} \quad (7)$$

(7) In the full-bridge rectifier circuit, the equivalent output impedance of the T-type impedance matching network is set to $Z_r = R_r + jX_r$, wherein $R_r$ is the rectifier load resistor of which the value changes with the fluctuation of the load resistor $R_L$; and $X_r$ is the parasitic reactance in the bridge rectifier circuit. $X_S$ is introduced as the matching impedance variable, and the equivalent input impedance $Z_i$ of the T-type impedance matching network is:

$$Z_i = -jX_S + \frac{jX_S(R_r + jX_r - jX_S - jX_r)}{jX_S + (R_r + jX_r - jX_S - jX_r)} = \frac{X_S^2}{R_r} \quad (8)$$

(8) In order to ensure that the input and output characteristics of the rectifier load circuit are not affected, $X_S$ obtained in combination with formula (6) shall meet the following conditions:

$$\begin{cases} X_S = X_{Cb2} - X_r = \dfrac{1}{\omega C_{b2}} - X_r \\ Z_{i\_\eta max} = \dfrac{X_S^2}{R_r} \end{cases} \quad (9)$$

wherein $Z_{i\_\eta max}$ is the matching resistance required for achieving the maximum transfer efficiency $\eta_{max}$, and $X_{C_{b2}}$ indicates the capacitive reactance of the capacitor $C_{b2}$ in the added load matching network. $X_S$ is determined to obtain:

$$\begin{cases} \omega C_{b1} = 1/X_S \\ \omega C_{b2} = 1/(X_S - X_r) \\ \omega L_b = X_S \end{cases} \quad (10)$$

For a set of matching capacitance and inductance values calculated from formula (10), the ARM microprocessor controlling relay array completes the real-time adjustment and switching of $C_{b1}$, $C_{b2}$ and $L_b$ and realizes the functions of the T-type impedance matching network so that the system is kept to work under the maximum transfer efficiency.

Figure 1:
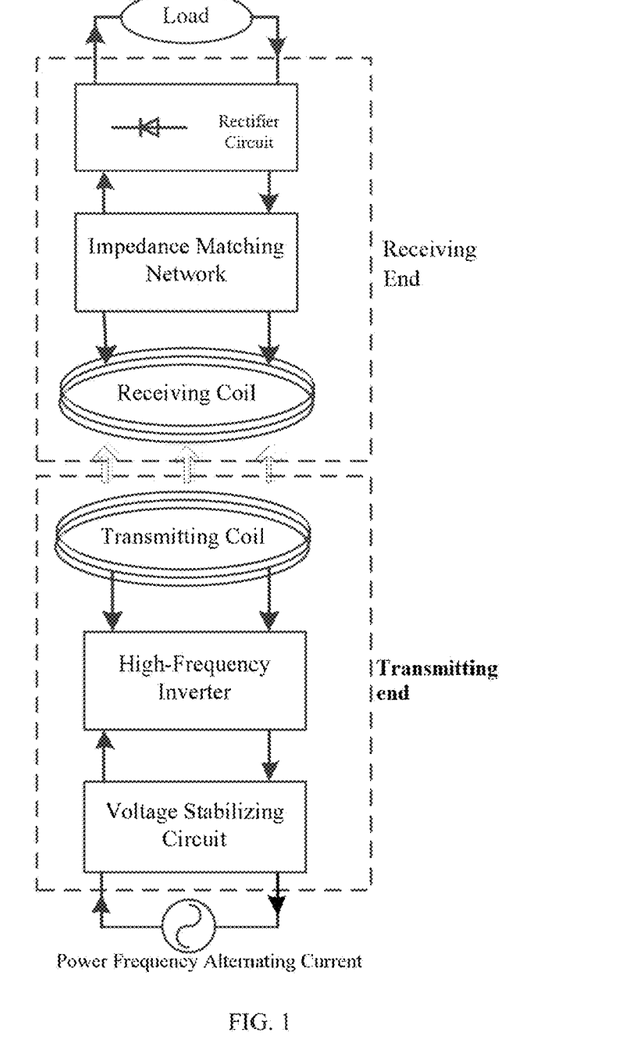
FIG. 1 is a structure diagram of transfer of the WPT system.
Figure 2:
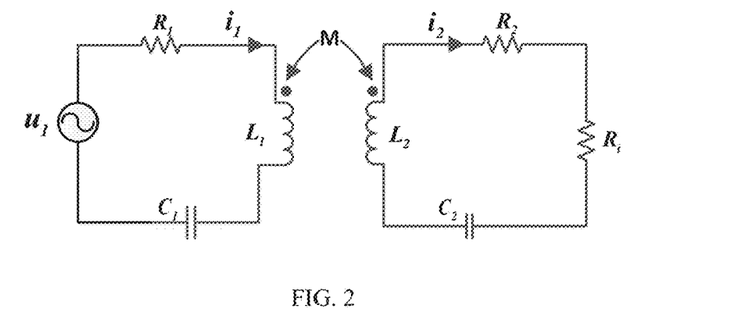
FIG. 2 shows an equivalent circuit model of the WPT system.
Figure 3:
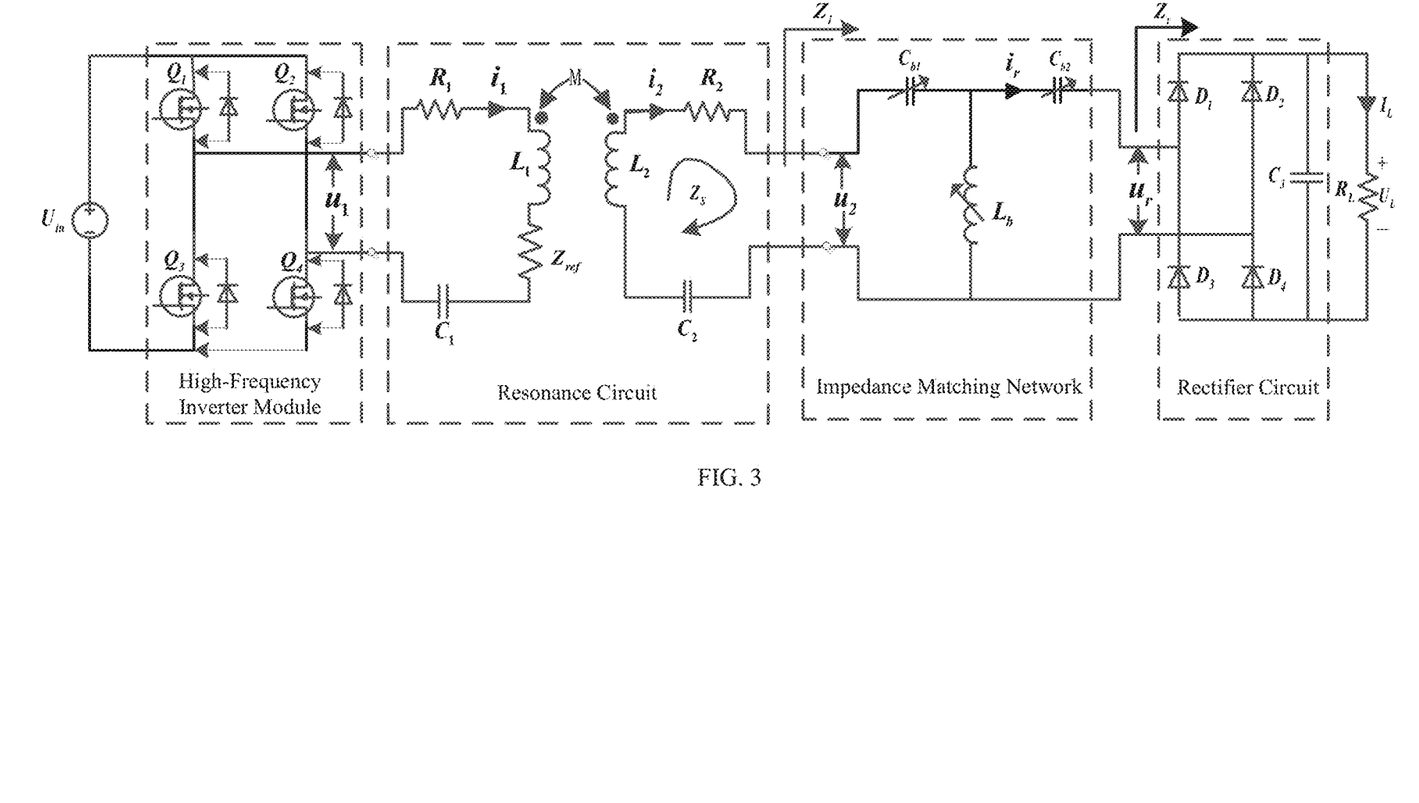
FIG. 3 is a main circuit diagram of the WPT system under maximum efficiency tracking.

In practical application, if the load $R_L$ changes, $R_r$ will change accordingly, and the power of the system will also change. At this time, if the impedance matching network shown in FIG. 3 is added in the wireless power transfer system, $Z_i$ can be kept equal to the optimum load resistance $R_{i\_\eta max}$ in formula (7) by changing $X_S$ in real time, thereby achieving maximum efficiency point tracking. Meanwhile, the relationship between $X_S$ and $R_r$ can also be derived from formula (9), and expressed as:

$$X_S = \sqrt{R_r R_{i\_\eta max}} \quad (11)$$

Figure 4:
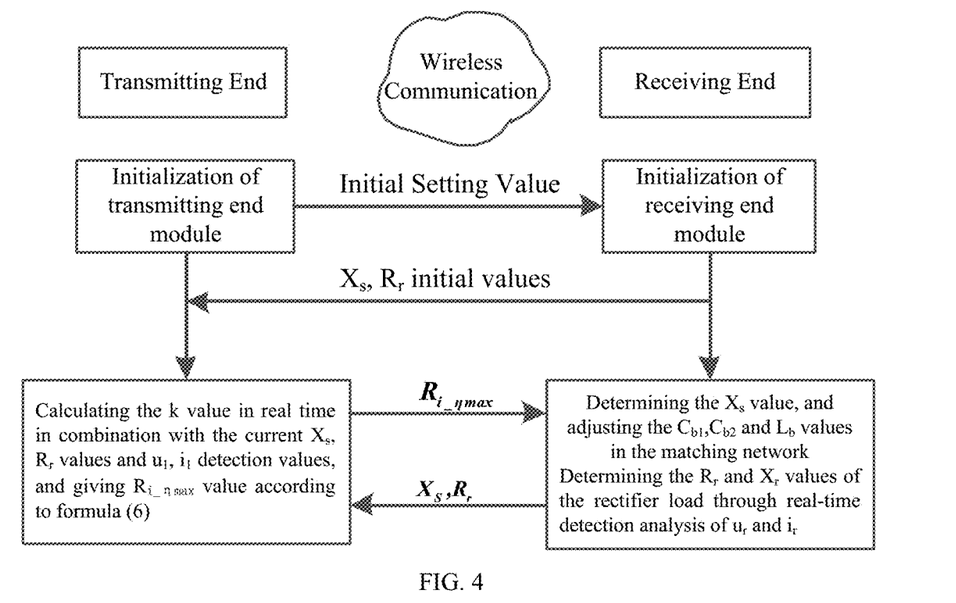
FIG. 4 shows an impedance matching network control flow for the WPT system under maximum efficiency tracking.

The impedance matching network control process for the WPT system under maximum efficiency tracking is shown in FIG. 4. When communication is established between the transmitting end and the receiving end, the transmitting end controller transmits an initialization command to the receiving end and transmits the initial setting value to the receiving end. The transmitting end controller combines the current $X_S$, $R_r$ and the detection values $u_1$, $i_1$ of the system to determine the $R_{i\_\eta max}$ value in combination with formula (6). Then $R_{i\_\eta max}$ is transmitted to the receiving end controller. The optimal matching $X_S$ value is determined in combination with formula (11), and the receiving end controller realizes the adjustment of the capacitors $C_{b1}$ and $C_{b2}$ and the inductor $L_b$ in the impedance matching network by on-line real-time switching. At the same time, after collecting $u_r$, $i_r$ data, the receiving end controller performs Fourier transform analysis to determine the resistance $R_r$ and the reactance $X_r$ of the current rectifier load.

The present invention has the following beneficial effects: the patent of the present invention designs a novel T-type impedance matching network according to the established equivalent circuit model of the WPT system, and has the advantages of simple adjustment principle, easy engineering realization, and enabling the system to work at the maximum transfer efficiency point compared with the existing method. The method proposed by the patent of the present invention provides an important theoretical basis and engineering approach for the WPT system to achieve the maximum transfer efficiency of electric energy under complicated conditions such as nonlinear characteristic of the rectifier circuit and load change.

DETAILED DESCRIPTION

The technical solution of the present invention is further described below in combination with specific embodiments.

1. MCR-WPT system structure of the patent of the present invention

The paten of the present invention is an impedance matching network optimization method for a WPT system under maximum efficiency tracking. The MCR-WPT system comprises a transmitting end and a receiving end, wherein the transmitting end is connected to a power frequency mains supply and composed of a voltage stabilizing circuit module, a high-frequency inverter module and a transmitting coil module. The receiving end of the WPT system supplies power to the load, and is composed of a receiving coil, an impedance matching network and a full-bridge rectifier circuit module. At present, for the non-relay WPT system, the MCR-WPT system model can be basically divided into four structures: series-series, series-parallel, parallel-series and parallel-parallel, based on the series-parallel resonant compensation method of the transmitting end and the receiving end. The patent of the present invention mainly adopts a series resonance structure widely used in practical application systems for modeling and analysis, and the analysis method in the patent of the present invention is suitable for the WPT system in any structural form.

The voltage stabilizing filter module converts 220 V mains supply to 48 V direct current, and performs corresponding smoothing filtering to eliminate harmonic waves in electrical signals. The voltage stabilizing filter module is connected with the high-frequency inverter module after outputting.

The high-frequency inverter module converts 48 V direct current to high-frequency alternating current, and the inverter frequency selected in the patent is 100 KHz. The high-frequency inverter module is connected with the transmitting coil module.

The transmitting coil module is composed of a resonant capacitor C1 and a transmitting coil L1 which are connected in series, and high-frequency electrical signals output by the high-frequency inverter module cause a series resonant circuit composed of the resonant capacitor C1 and the transmitting coil L1 to generate resonant voltage and resonant current. A receiving coil module L2 and a resonant capacitor C2 constitute a resonant compensation network of the receiving end, which has the same resonance frequency as the transmitting end. M is a mutual inductor between the transmitting coil and the receiving coil, and the tightness of the magnetic coupling between the two coils is expressed by a coupling coefficient $k=M/\sqrt{L_1L_2}$. $R_1$ and $R_2$ are equivalent resistors of the transmitting circuit and the receiving circuit, and $R_i$ is an equivalent resistor on the load side. Energy is transferred from the transmitting end to the receiving end through electromagnetic resonance. The receiving coil module is connected with an impedance matching network module.

The impedance matching network module is composed of capacitors $C_{b1}$, $C_{b2}$ and an inductor $L_b$ of which the switching of the corresponding matching values is realized by a microprocessor controlling relay array. The impedance matching network module is connected with the rectifier circuit module.

The rectifier circuit module is a full-bridge rectifier composed of rectifier diodes $D_1$-$D_4$, and $C_3$ is a bridge rectifier filter capacitor of which the charging and discharging effects are used to smooth the output voltage $U_L$. The rectifier circuit module is directly connected with the load resistor $R_L$.

2. Transfer model of WPT system of the patent of the present invention The transmitting coil and the receiving coil in the transfer model of the WPT system have the same resonance frequency, and the parameters of the two coils are assumed to be determined, wherein $u_1$ is the equivalent voltage source after the power transfer system passes through the high-frequency inverter circuit, and $i_1$ and $i_2$ are respectively the high-frequency resonant currents of the transmitting end and the receiving end. $L_1$ is the inductor of the transmitting coil, $L_2$ is the inductor of the receiving coil, $C_1$ and $C_2$ are resonant compensation capacitors corresponding to the transmitting end and the receiving end, M is a mutual inductor between the transmitting coil and the receiving coil, and the tightness of the magnetic coupling between the two coils is expressed by a coupling coefficient $k=M/\sqrt{L_1L_2}$. $R_1$ and $R_2$ are equivalent resistors of the transmitting circuit and the receiving circuit, and $R_i$ is an equivalent resistor on the load side.

According to Kirchhoff's voltage law, the loop equation of the equivalent model is:

$$\begin{cases} \dot{U}_1 = Z_1 \dot{I}_1 - j\omega M \dot{I}_2(1) \\ 0 = Z_2 \dot{I}_2 - j\omega M \dot{I}_1 \end{cases} \quad (1)$$

wherein $\dot{U}_1$, $\dot{I}_1$ and $\dot{I}_2$ are respectively vector representations of voltages $u_1$, $i_1$ and $i_2$, and $Z_1$ and $Z_2$ are equivalent impedances of the transmitting end and the receiving end, which meet:

$$\begin{cases} Z_1 = R_1 + j\left(\omega L_1 - \dfrac{1}{\omega C_1}\right) \\ Z_2 = R_2 + R_i + j\left(\omega L_2 - \dfrac{1}{\omega C_2}\right) \end{cases} \quad (2)$$

The transmitting coil and the receiving coil have the same structure, that is $L_1=L_2=L$, $R_1=R_2=R$ and $C_1=C_2=C$. Therefore, the resonance frequency $f=1/2\pi\sqrt{LC}$ of the circuit can be determined by selecting appropriate parameters for L and C.

Based on formulas (1) and (2), the current values of both sides can be calculated as follows:

$$\begin{cases} \dot{I}_1 = \dfrac{Z_2 \dot{U}_1}{Z_1 Z_2 + \omega^2 M^2} \\ \dot{I}_2 = \dfrac{j\omega M \dot{U}_1}{Z_1 Z_2 + \omega^2 M^2} \end{cases} \quad (3)$$

wherein $\omega$ is the resonance angular frequency that meets $\omega=2\pi f$, and when resonance occurs, that is $Z_1=R$, $Z_2=R+R_i$. The input power $P_{in}$ of the WPT system and the output power $P_{out}$ of the $R_i$ end can be calculated as follows:

$$\begin{cases} P_{in} = \dfrac{U_1^2(R+R_i)}{R^2 + RR_i + \omega^2 M^2} \\ P_{out} = \dfrac{\omega^2 M^2 U_1^2 R_i}{(R^2 + RR_i + \omega^2 M^2)^2} \end{cases} \quad (4)$$

wherein $U_1$ is the effective value of the input power supply voltage $u_1$, and the transfer efficiency $\eta$ can be calculated from formula (4):

$$\eta = \dfrac{P_{out}}{P_{in}} = \dfrac{\omega^2 M^2 R_i}{(R+R_i)(R^2 + RR_i + \omega^2 M^2)} \quad (5)$$

By deriving $R_i$ of formula (5), the optimal load condition for maximizing the transfer efficiency can be obtained as follows:

$$\begin{cases} \dfrac{d\eta}{dR_i} = 0 \\ \dfrac{d^2\eta}{dR_i^2} < 0 \end{cases} \to R_{i\_\eta max} = \sqrt{R^2 + \omega^2 M^2} \quad (6)$$

By substituting formula (6) into formula (5), the maximum output transfer efficiency $\eta_{max}$ can be calculated as follows:

$$\eta_{max} = \dfrac{\omega^2 M^2 R_{i\_\eta max}}{(R+R_{i\_\eta max})(R^2 + RR_{i\_\eta max} + \omega^2 M^2)} \quad (7)$$

According to the maximum transfer efficiency formula obtained above, the realization principles of the patent of the present invention can be analyzed and listed. FIG. 3 is a circuit diagram of the WPT system of the patent of the present invention. Two left boxes are the transmitting end loop and part of the receiving end loop of the universal magnetic coupling resonant circuit, the third box from the left is the T-type impedance matching network proposed by the patent of the present invention, and the rightmost box is the universal full-bridge rectifier circuit, wherein $D_1$-$D_4$ constitute the full-bridge rectifier, and $C_3$ is the bridge rectifier filter capacitor of which the charging and discharging effects are used to smooth the output voltage $U_L$; for the capacitors $C_{b1}$, $C_{b2}$ and the inductor $L_b$, the switching of the corresponding matching capacitance values is realized by the microprocessor controlling relay array so as to realize the functions of the T-type impedance matching network proposed by the patent of the present invention, that is, to ensure the maximum output transfer efficiency $\eta_{max}$. In FIG. 3, $i_r$, $u_r$ are the input current and voltage of the bridge rectifier, and $Z_i$ is the equivalent output impedance of the resonant secondary circuit, which is equivalent to the equivalent input impedance of the impedance matching network. $Z_r$ is the equivalent output impedance of the impedance matching network shown, which is equivalent to the equivalent input impedance of the rectifier circuit. $R_L$ is the load resistor, $U_L$ and $I_L$ are respectively the output direct current voltage and direct current of $R_L$.

In the T-type impedance matching network shown in FIG. 3, the rectifier load impedance $Z_r=_rjX_r$ is assumed, wherein $R_r$ is the rectifier load resistance of which the value changes with the fluctuation of the load resistance $R_L$; and $X_r$ is the parasitic reactance in the bridge rectifier circuit. $X_S$ is now introduced as the matching impedance variable, the impedance matching network is designed as shown in FIG. 3, and $Z_i$ can be calculated as follows:

$$Z_i = -jX_S + \dfrac{jX_S(R_r + jX_r - jX_S - jX_r)}{jX_S(R_r + jX_r - jX_S - jX_r)} = \dfrac{X_S^2}{R_r} \quad (8)$$

In order to ensure that the input and output characteristics of the rectifier load circuit are not affected, $X_S$ obtained in combination with formula (6) shall meet the following conditions:

$$\begin{cases} X_S = X_{Cb2} - X_r = \dfrac{1}{\omega C_{b2}} - X_r \\ Z_{i\_\eta max} = \dfrac{X_S^2}{R_r} \end{cases} \quad (9)$$

wherein $Z_{i\_\eta max}$, is the matching resistance required for achieving the maximum transfer efficiency $\eta_{max}$. $X_S$ is determined to obtain:

$$\begin{cases} \omega C_{b1} = 1/X_S \\ \omega C_{b2} = 1/(X_S - X_r) \\ \omega L_b = X_S \end{cases} \quad (10)$$

For a set of matching capacitance and inductance values calculated from formula (10), the ARM microprocessor controlling relay array completes the real-time adjustment and switching of $C_{b1}$, $C_{b2}$ and $L_b$ and realizes the functions of the impedance matching network so that the system is kept to work under the maximum transfer efficiency.

In practical application, if the load $R_L$ changes, $R_r$ will change accordingly, and the power of the system will also change. At this time, if the impedance matching network shown in FIG. 3 is added in the wireless power transfer system, $Z_i$ can be kept equal to the optimum load resistance $R_{i\_\eta max}$ in formula (7) by changing $X_S$ in real time, thereby achieving maximum efficiency point tracking. Meanwhile, the relationship between $X_S$ and $R_r$ can also be derived from formula (9), and expressed as:

$$X_S = \sqrt{R_r R_{i-\eta max}} \quad (11)$$

The impedance matching network control process for the WPT system under maximum efficiency tracking is shown in FIG. 4. When communication is established between the transmitting end and the receiving end, the transmitting end controller transmits an initialization command to the receiving end and transmits the initial setting value to the receiving end. The transmitting end controller combines the current $X_S$, $R_r$ and the detection values $u_1$, $i_1$ of the system to determine the $R_{i\_\eta max}$ value in combination with formula (6). Then $R_{i\_\eta max}$ is transmitted to the receiving end controller. The optimal matching $X_S$ value is determined in combination with formula (11), and the receiving end controller realizes the adjustment of the capacitors $C_{b1}$ and $C_{b1}$ and the inductor $L_b$ in the impedance matching network by on-line real-time switching. At the same time, after collecting $u_r$, $i_r$ data, the receiving end controller performs Fourier transform analysis to determine the resistance $R_r$ and the reactance $X_r$ of the current rectifier load.

The main parameters of the WPT system circuit involved in the present invention are shown in Table 1. According to the foregoing technical solution, the steps of the embodiment are as follows:

(1) Initializing parameters. When communication is established between the transmitting end and the receiving end, the transmitting end controller transmits an initialization command to the receiving end and transmits the initial setting value to the receiving end.

(2) In a sampling period, respectively executing:
  ① Monitoring $u_1$ and $i_1$ in real time by the transmitting end controller, calculating the value of the coupling coefficient k, and using formula (6) to determine the $R_{i\text{-}\eta max}$ value.
  ② Transmitting k and $R_{i\text{-}\eta max}$ to the receiving end controller, using formula (11) to determine the $X_S$ value, and realizing the adjustment of the capacitors $C_{b1}$ and $C_{b2}$ in the impedance matching network by the receiving end controller.
  ③ Collecting the load end voltage $u_r$ and the load current $i_r$ by the receiving end controller, and transmitting the detection values to the transmitting end controller. Meanwhile, determining the resistance $R_r$ and the reactance $X_r$ of the current rectifier load through Fourier transform. If $R_r$ changes, the corresponding $X_S$ value can be obtained through formula (11), and the adjustment of the capacitors $C_{b1}$ and $C_{b2}$ in the impedance matching network can be realized at the same time.
  ④ If the above parameters do not change within this period, the parameters of the impedance matching network are not adjusted.

(3) Executing the adjustment process of the next sampling period and returning to step (2).

Figure 5:
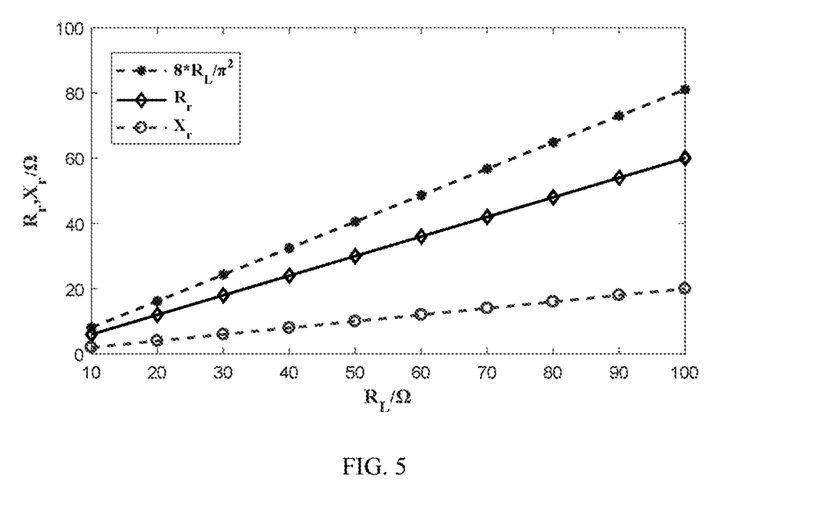
FIG. 5 is a contrast curve of rectifier loads.

Result of Embodiment:

Simulation analysis is performed on the inductive characteristics of the rectifier load by means of the Simulink tool by taking different values of the load $R_L$ under the coupling coefficient k=0.1 by using the parameters given in Table 1. According to the impedance matching network design method of the receiving end in FIG. 3, the equivalent rectifier load of the system can be solved by Fourier analysis of the input voltage $u_r$ and current $i_r$ of the bridge rectifier. FIG. 5 shows the curve of the rectifier load $Z_i$ of the system changing with different values of the load $R_L$. Because the transmitting end and the receiving end are independent of each other, the influence of the parameter change of the transmitting end on the rectifier load is not considered during simulation. It can be seen from FIG. 5 that the rectifier load $Z_i$ presents the inductive characteristic, and the actual part thereof is less than $8R_L/\pi^2$. When the load $R_L$ changes, the impedance matching network design method proposed by the present invention shall be used to reset the parameters of the impedance matching network.

Figure 6:
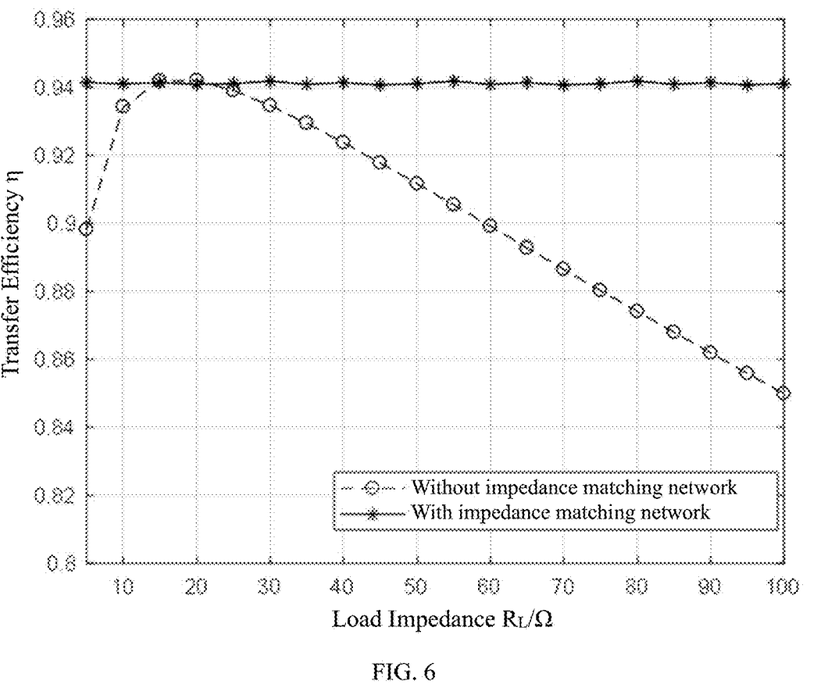
FIG. 6 is a comparison diagram of transfer efficiency under a coupling coefficient k=0.1.
Figure 7:
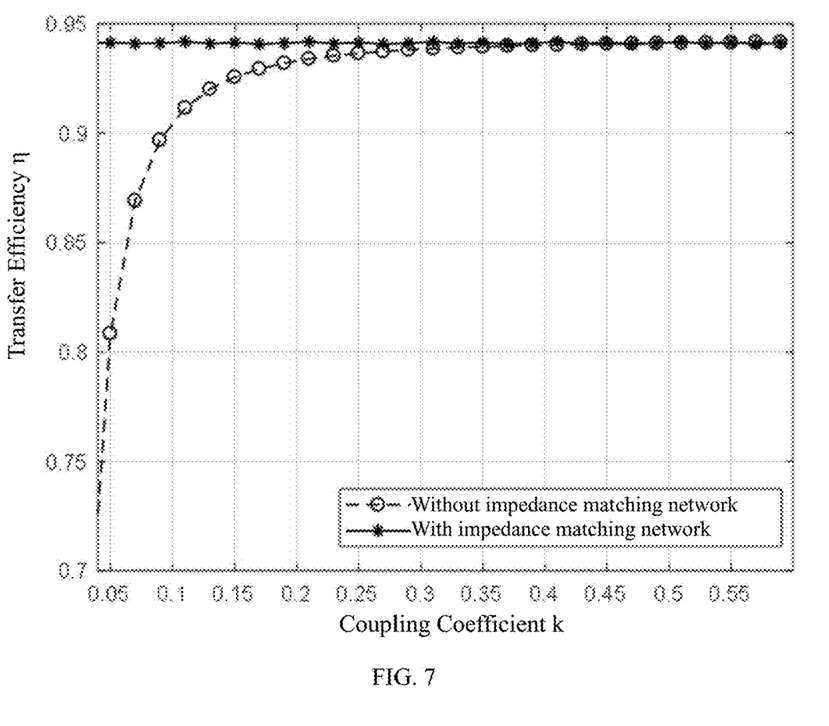
FIG. 7 is a comparison diagram of transfer efficiency under the load $R_L$=25Ω.

The impedance matching network is designed in combination with the system parameters in Table 1, and the simulation analysis is performed. It can be known from the foregoing analysis that the adjustment of the capacitors $C_{b1}$ and $C_{b2}$ in the impedance matching network depends on whether the coupling coefficients k and $R_L$ change. Under the premise of not considering the loss of switching devices and component resistors, FIG. 6 shows the comparison diagram of the transfer efficiency η of the system under different loads $R_L$ with or without the impedance matching network under the coupling coefficient k=0.1. FIG. 7 shows the comparison diagram of the transfer efficiency η of the system under different coupling coefficients k with or without the impedance matching network when $R_L$=25Ω.

It can be seen from the above simulation diagram that the receiving end with the impedance matching network of the wireless charging system can achieve optimal load matching, and at the same time, the impedance matching network considers the influence of the inductive characteristics of the rectifier load, the imaginary part of the complex impedance of the receiving loop can be accurately matched to be close to zero, so the transfer efficiency is greatly improved compared with that of the system without the impedance matching network. FIG. 7 shows that in the case that the coupling coefficient k<0.25, the system with the impedance matching network has higher transfer efficiency and more stability than the system without the impedance matching network and is very close to the set target value. In the case that k≥0.25, the system with the impedance matching network and the system without the impedance matching network can be close to the set target value.

The present invention establishes an equivalent circuit model of the WPT system in view of the problem that the problem that the change of the transfer distance or load of the WPT system will cause the nonlinearity of the circuit and thus reduce the transfer efficiency. In order to allow the system to work at the maximum efficiency point, a novel impedance matching network structure and dynamic optimization method for a WPT system under the maximum transfer efficiency is proposed. The method can analyze the nonlinearity of a bridge rectifier circuit, the adaptability of load change and other factors related to the maximum efficiency tracking, and provide an important basis for the WPT system to realize the maximum transfer efficiency.

The invention claimed is:
1. An impedance matching network optimization method for a wireless power transfer system under maximum efficiency tracking, comprising the following steps:
1) structure of wireless power transfer system
the wireless power transfer system comprises a transmitting end and a receiving end, wherein the transmitting end is connected to a power frequency mains supply and mainly composed of a voltage stabilizing circuit module, a high-frequency inverter module and a transmitting coil; the receiving end supplies power to the load, and is composed of a receiving coil, a T-type impedance matching network and a full-bridge rectifier circuit;
the voltage stabilizing circuit module converts 220 V mains supply to 48 V direct current and performs corresponding smoothing filtering to eliminate harmonic waves in electrical signals, and the voltage stabilizing circuit module is connected with the high-frequency inverter module after outputting; the high-frequency inverter module converts 48 V direct current to high-frequency alternating current, and the high-frequency inverter module is connected with the transmitting coil; the transmitting coil is composed of a resonant capacitor $C_1$ and a transmitting coil $L_1$ which are connected in series, and high-frequency electrical signals output by the high-frequency inverter module cause a series resonant circuit composed of the resonant capacitor $C_1$ and the transmitting coil $L_1$ to generate resonant voltage and resonant current;
A receiving coil $L_2$ and a resonant capacitor $C_2$ constitute a resonant compensation network of the receiving end, which has the same resonance frequency as the transmitting end; M is a mutual inductor between the transmitting coil and the receiving coil, and the tightness of the magnetic coupling between the two coils is expressed by a coupling coefficient $k=M/\sqrt{L_1 L_2}$; $R_1$ and $R_2$ are equivalent resistors of the transmitting circuit and the receiving circuit, and $R_i$ is an equivalent resistor on the load side; energy is transferred from the transmitting end to the receiving end through electromagnetic resonance; the receiving coil is connected to the T-type impedance matching network; the T-type impedance matching network is composed of capacitors $C_{b1}$, $C_{b2}$ and an inductor $L_b$ of which the switching of the corresponding matching values is realized by a microprocessor controlling relay array, and connected with the full-bridge rectifier circuit; the full-bridge rectifier circuit is composed of rectifier diodes $D_1$, $D_2$, $D_3$ and $D_4$, $C_3$ is a rectifier bridge filter capacitor of which the charging and discharging effects are used to smooth the output voltage $U_L$, and the full-bridge rectifier circuit is directly connected with the load resistor $R_L$;
2) impedance matching network design method for wireless power transfer system under maximum efficiency tracking
(1) the transmitting coil and the receiving coil in the transfer model of the WPT system have the same resonance frequency, and the parameters of the two coils are assumed to be determined, wherein $u_1$ is the equivalent voltage source after the power transfer system passes through the high-frequency inverter circuit, and $i_1$ and $i_2$ are respectively the high-frequency resonant currents of the transmitting end and the receiving end;

(2) according to Kirchhoff's voltage law, the loop equation of the equivalent model is:

$$\begin{cases} \dot{U}_1 = Z_1 \dot{I}_1 - j\omega M \dot{I}_2 \\ 0 = Z_2 \dot{I}_2 - j\omega M \dot{I}_1 \end{cases} \quad (1)$$

wherein $\dot{U}_1$, $\dot{I}_1$ and $\dot{I}_2$ are respectively vector representations of voltages $u_1$, $i_1$ and $i_2$, and $Z_1$ and $Z_2$ are equivalent impedances of the transmitting end and the receiving end, which meet:

$$\begin{cases} Z_1 = R_1 + j\left(\omega L_1 - \dfrac{1}{\omega C_1}\right) \\ Z_2 = R_2 + R_i + j\left(\omega L_2 - \dfrac{1}{\omega C_2}\right) \end{cases} \quad (2)$$

(3) the transmitting coil and the receiving coil have the same structure, that is $L_1=L_2=L$, $R_1=R_2=R$ and $C_1=C_2=C$; and therefore, the resonance frequency $f=1/2\pi\sqrt{LC}$ of the circuit is determined by selecting appropriate parameters for L and C;
(4) based on formulas (1) and (2), the current values of both sides are calculated as follows:

$$\begin{cases} \dot{I}_1 = \dfrac{Z_2 \dot{U}_1}{Z_1 Z_2 + \omega^2 M^2} \\ \dot{I}_2 = \dfrac{j\omega M \dot{U}_1}{Z_1 Z_2 + \omega^2 M^2} \end{cases} \quad (3)$$

wherein $\omega$ is the resonance angular frequency that meets $\omega=2\pi f$, and when resonance occurs, that is $Z_1=R$, $Z_2=R+R_i$;
(5) the input power $P_{in}$ of the WPT system and the output power $P_{out}$ of the $R_i$ end are calculated as follows:

$$\begin{cases} P_{in} = \dfrac{U_1^2 (R + R_i)}{R^2 + RR_i + \omega^2 M^2} \\ P_{out} = \dfrac{\omega^2 M^2 U_1^2 R_i}{(R^2 + RR_i + \omega^2 M^2)^2} \end{cases} \quad (4)$$

wherein $U_1$ is the effective value of the input power supply voltage $u_1$, and the transfer efficiency $\eta$ is calculated from formula (4):

$$\eta = \dfrac{P_{out}}{P_{in}} = \dfrac{\omega^2 M^2 R_i}{(R + R_i)(R^2 + RR_i + \omega^2 M^2)} \quad (5)$$

(6) by deriving $R_i$ of formula (5), the optimal load condition for maximizing the transfer efficiency is obtained as follows:

$$\begin{cases} \dfrac{d\eta}{dR_i} = 0 \\ \dfrac{d^2\eta}{dR_i^2} < 0 \end{cases} \rightarrow R_{i-\eta max} = \sqrt{R^2 + \omega^2 M^2} \quad (6)$$

by substituting formula (6) into formula (5), the maximum output transfer efficiency $\eta_{max}$ is calculated as follows:

$$\eta_{max} = \frac{\omega^2 M^2 R_{i-\eta max}}{(R + R_{i-\eta max})(R^2 + RR_{i-\eta max} + \omega^2 M^2)} \quad (7)$$

(7) in the full-bridge rectifier circuit, the equivalent output impedance of the T-type impedance matching network is set to $Z_r = R_r + jX_r$, where $R_r$ is the rectifier load resistor of which the value changes with the fluctuation of the load resistor $R_L$; $X_r$ is the parasitic reactance in the bridge rectifier circuit; and $X_S$ is introduced as the matching impedance variable, and the equivalent input impedance $Z_i$ of the T-type impedance matching network is:

$$Z_i = -jX_S + \frac{jX_S(R_r + jX_r - jX_S - jX_r)}{jX_S(R_r + jX_r - jX_S - jX_r)} = \frac{X_S^2}{R_r} \quad (8)$$

(8) in order to ensure that the input and output characteristics of the rectifier load circuit are not affected, $X_S$ obtained in combination with formula (6) shall meet the following conditions:

$$\begin{cases} X_S = X_{Cb2} - X_r = \dfrac{1}{\omega C_{b2}} - X_r \\ Z_{i\_\eta max} = \dfrac{X_S^2}{R_r} \end{cases} \quad (9)$$

wherein $Z_{i\_\eta max}$ is the matching resistance required for achieving the maximum transfer efficiency $\eta_{max}$, and $X_{C_{b2}}$ indicates the capacitive reactance of the capacitor $C_{b2}$ in the added load matching network; and $X_S$ is determined to obtain:

$$\begin{cases} \omega C_{b1} = 1/X_S \\ \omega C_{b2} = 1/(X_S - X_r) \\ \omega L_b = X_S \end{cases} \quad (10)$$

for a set of matching capacitance and inductance values calculated from formula (10), the microprocessor controlling relay array completes the real-time adjustment and switching of $C_{b1}$, $C_{b2}$ and $L_b$, and realizes the functions of the T-type impedance matching network so that the system is kept to work under the maximum transfer efficiency.

\* \* \* \* \*